United States Patent [19]
Burnett

[11] 4,101,010
[45] Jul. 18, 1978

[54] DRUM BRAKE WITH AUTOMATIC ADJUSTMENT

[75] Inventor: Richard T. Burnett, South Bend, Ind.

[73] Assignee: The Bendix Corporation, Southfield, Mich.

[21] Appl. No.: 784,764

[22] Filed: Apr. 5, 1977

[51] Int. Cl.$^2$ .................. F16D 51/20; F16D 65/52
[52] U.S. Cl. .................. 188/79.5 P; 188/79.5 GE; 188/106 A; 188/196 P; 188/216
[58] Field of Search ............. 188/79.5 GE, 79.5 P, 188/106 A, 106 F, 196 P, 216, 328

[56] References Cited

U.S. PATENT DOCUMENTS

| 2,345,107 | 3/1944 | Goepfrich | 188/106 A |
|---|---|---|---|
| 2,358,740 | 9/1944 | Scott-Iversen | 188/79.5 GE |
| 3,064,767 | 11/1962 | Wieger | 188/106 A |
| 3,362,507 | 1/1968 | Liverance | 188/106 F |
| 3,377,076 | 4/1968 | Burnett | 188/196 P |

FOREIGN PATENT DOCUMENTS 578,038  6/1946  United Kingdom ............ 188/196 P

Primary Examiner—Trygve M. Blix
Assistant Examiner—Edward R. Kazenske
Attorney, Agent, or Firm—Paul David Schoenle; Ken C. Decker

[57] ABSTRACT

A drum brake includes a pair of brake shoes and a hydraulic actuator which is engageable with the brake shoes to expand the latter during braking. The hydraulic actuator carries a pair of elastomeric sealing rings which are deformable during braking as a pair of pistons slidably disposed with the hydraulic actuator are movable upon a braking application. When braking is terminated, the elastomeric sealing rings return to their original stored configuration thereby retracting the pair of pistons within the hydraulic actuator. In order to retract the pair of brake shoes with the pistons through a predetermined distance, a first spring engages the pair of brake shoes substantially opposite the hydraulic actuator and biases the brake shoes toward each other while a second spring biases the brake shoes away from each other. The second spring is carried by a strut on a parking brake actuator and the strut extends from one of the brake shoes to a lever which is pivotally mounted on the other brake shoe.

2 Claims, 2 Drawing Figures

DRUM BRAKE WITH AUTOMATIC ADJUSTMENT

BACKGROUND OF THE INVENTION

A hydraulic actuator in a drum brake assembly includes a pair of pistons which are slidably disposed within a bore on the hydraulic actuator. The pistons engage a pair of brake shoes in order to urge the brake shoes into engagement with a drum to effectuate braking. When braking is terminated, a return spring retracts the pistons and brake shoes away from the drum; however, elastomeric return seals such as illustrated in my U.S. Pat. No. 3,377,076, also serve to retract the piston and brake shoe lining, provided a connecting structure between the piston and brake shoe exists.

When an elastomeric return seal is used with a hydraulic actuator on a drum brake, it is desirable to retract the pair of brake shoes from a rotatable member, when braking is terminated, through a predetermined distance equal to a running clearance. However, retraction of the pistons and brake shoes should be limited to this predetermined distance so that the pistons and brake shoes need only travel through the predetermined distance upon a subsequent brake application.

SUMMARY OF THE INVENTION

In the present invention a drum brake assembly includes a hydraulic actuator for urging a pair of brake shoes into engagement with a rotatable member, such as a wheel drum, to effectuate braking. When braking is terminated, a pair of elastomeric seals retract a pair of pistons slidably mounted in the hydraulic actuator and a first and second resilient member maintain the pair of brake shoes in engagement with the pistons so that the pair of brake shoes are retracted with the pistons. However, the resilient members cooperate with each other to prevent retraction of the pair of brake shoes beyond a predetermined distance, which is substantially equal to a running clearance between the rotatable member and the pair of brake shoes.

In particular, the first resilient member extends from one brake shoe to the other brake shoe and is positioned opposite the hydraulic actuator. The first resilient member biases the pair of brake shoes away from the rotatable member so that the brake shoes remain in engagement with the hydraulic actuator while the second resilient member offsets the first resilient member by biasing the pair of brake shoes away from the hydraulic actuator. Consequently, the sealing engagement between the pair of pistons within the hydraulic actuator and the pair of elastomeric seals limits the retraction of the pair of pistons and the pair of brake shoes to a running clearance.

DETAILED DESCRIPTION

Figure 1:
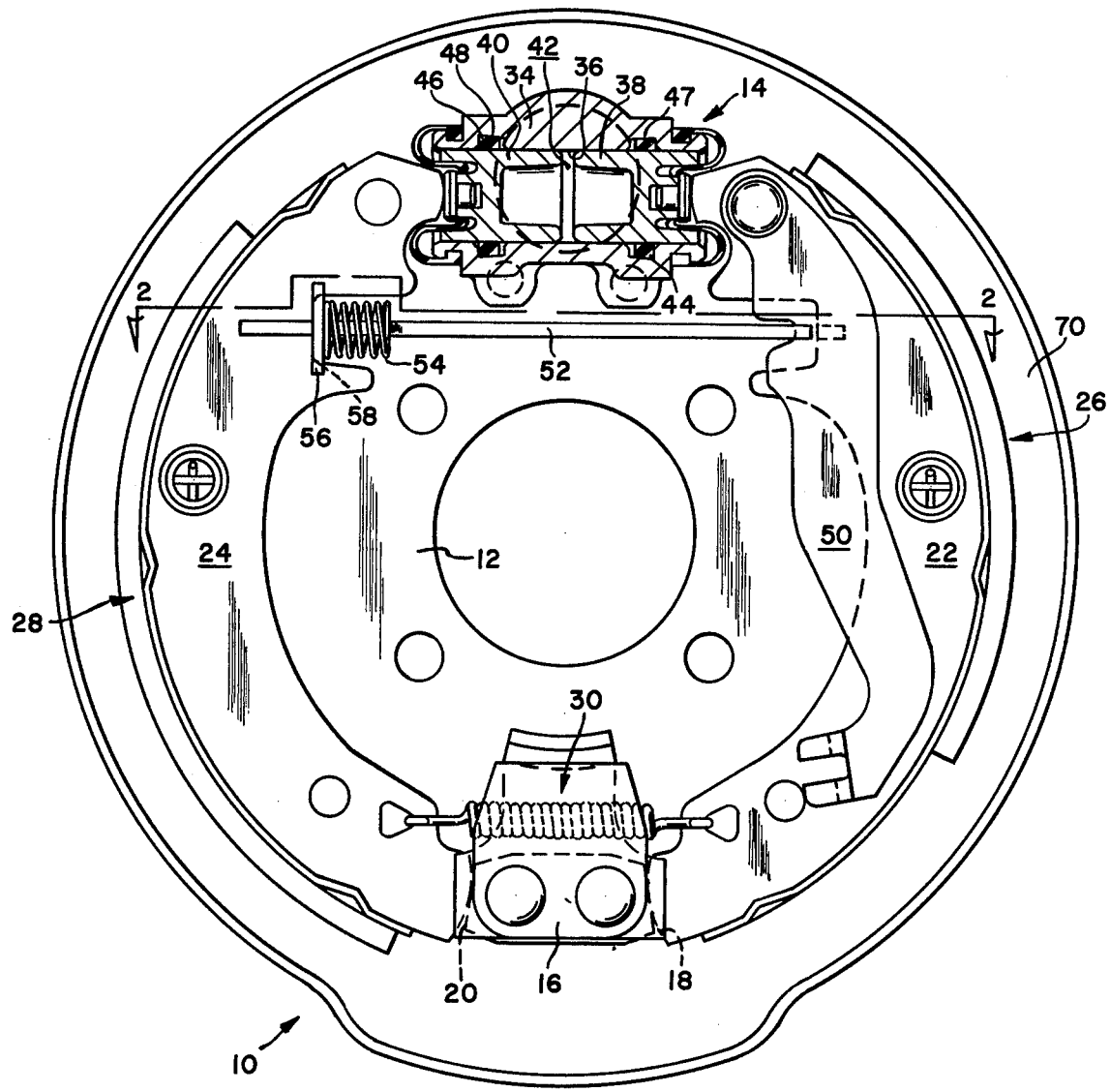
FIG. 1 is a front cross-sectional view of a drum brake assembly.

In the preferred embodiment of FIG. 1, a drum brake generally referred to as numeral 10 includes a backing plate 12 which is secured in a well-known manner to a nonrotatable portion of an axle assembly (not shown). The backing plate 12 supports a hydraulic actuator 14 and an anchor plate 16.

The anchor plate 16 includes opposed slots 18 and 20 for receiving respective webs 22 and 24 of brake shoes 26 and 28. A tension spring 30 near the anchor plate 16 extends from web 22 to web 24 and urges the webs into engagement with the slots 18 and 20.

The hydraulic actuator 14 is provided with a housing 34 within which a bore 36 slidably receives a first piston 38 and a second piston 40. The pistons cooperate with the bore 36 to define a pressure chamber 42 which communicates with a fluid pressure source (not shown), such as a master brake cylinder. A first elastomeric sealing ring 44 and a second elastomeric sealing ring 46 cooperate with respective pistons 38 and 40 to seal the pressure chamber 42. Moreover, the rings 44 and 46 are disposed in grooves 47 and 48 with tapered side walls and frusto conical bottom surfaces so that the rings provide limited retraction of the pistons 38 and 40 in accordance with U.S. Pat. No. 3,377,076.

Figure 2:
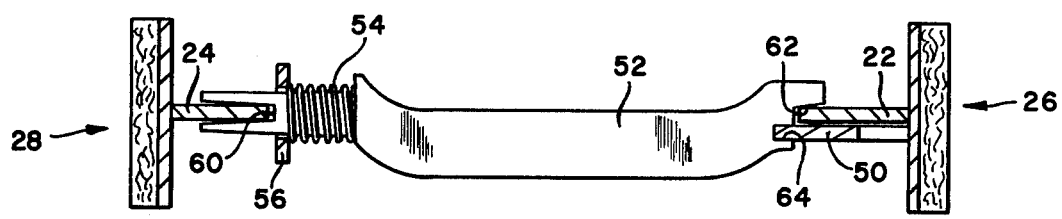
FIG. 2 is a cross-sectional view taken along line 2—2 in FIG. 1.

A parking brake lever 50 is pivotally mounted on the brake shoe 26 and a strut 52 extends from the brake shoe 28 to the brake shoe 26 to engage the parking lever 50 and the web 22 as illustrated in FIG. 2. The strut 50 carries a compression spring 54 urging the brake shoes 26 and 28 away from each other by means of the strut 52 and a plate 56 which includes slots 58 for receiving the web 24 of brake shoe 28. Moreover, the strut 52 is provided with a first slot 60 for receiving web 24, a second slot 62 for receiving web 22 and a third slot 64 adjoining the second slot 62 for receiving the parking brake lever 50.

In accordance with the invention the tension spring 30, near the anchor plate 16, biases the brake shoes 26 and 28 toward the anchor plate thereby creating a moment about the anchor plate urging the brake shoes toward each other, or into engagement with corresponding pistons 38 and 40. Such moment maintains the brake shoes 26 and 28 in engagement with the respective pistons during braking and when braking is terminated so that retraction of the pistons by the elastomeric sealing rings also retracts the brake shoes away from a rotatable member 70 such as wheel drum.

Generally, the retraction of the brake shoes will be controlled by the elastomeric sealing rings 44 and 46, as described in the aforementioned U.S. Pat. No. 3,377,076, and the taper of the side walls of the grooves 47 and 48. However, if the moment created by the tension spring 30 is large enough to overcome the frictional engagement between the pistons and the elastomeric sealing rings, the brake shoes and pistons will be fully retracted after each brake application. In order to limit the retraction to a running clearance, the compression spring 54 is provided to substantially counteract the moment created by the tension spring 30. Consequently, the elastomeric sealing rings control the retraction of the pistons and brake shoes such that a running clearance is maintained between the shoes and the rotatable member, regardless of the worn condition of the brake shoes. In particular, the tension spring 30 creates a moment for the brake shoes about torque plate 16 which is slightly larger than the moment created by compression spring 54 but less than the sum of moments created by the compression spring 54 and the frictional engagement between the pistons and the elastomeric sealing rings.

With the tension spring 30 and the compression spring 54 cooperating with the elastomeric sealing rings 44 and 46 to retract the brake shoes through only a running clearance, automatic adjustment of the brake shoes occurs after each braking application.

In conclusion, it is seen that the tension spring 30 urges the brake shoes into engagement with the anchor plate 16 and also creates a moment for the brake shoes about the latter to maintain the brake shoes in engagement with the hydraulic actuator pistons. A compression spring 54 counteracts this moment such that the frictional engagement between the elastomeric sealing rings and the pistons provides for retraction of the brake shoes through a running clearance after each braking application.

Although the invention has been described in conjunction with a specific embodiment, it is intended that all modifications of the specific embodiment are included within the scope of the invention as determined by the appended claims.

I claim:

1. In a drum brake having a backing plate, a pair of brake shoes engageable with the drum, a hydraulic actuator cooperating with adjacent first ends of the pair of brake shoes to urge the pair of brake shoes into a braking position and a parking mechanism cooperating with the pair of brake shoes to also urge the pair of brake shoes into the braking position and an anchor attached to the backing plate and cooperating with adjacent second ends of the pair of brake shoes, the improvement wherein a first resilient member engages said pair of brake shoes opposite said hydraulic actuator and adjacent said anchor in order to urge said pair of brake shoes into engagement with said anchor, said hydraulic actuator including a pair of pistons engageable with said first ends of said brake shoes respectively and a pair of sealing rings cooperating with said pistons and being deformable when said pair of pistons move said pair of brake shoes to the braking position, and a second resilient member carried by said parking mechanism, said first resilient member and said second resilient member creating moments for said pair of brake shoes about said anchor, said moments being substantially equal and opposite to permit said pair of sealing rings to retract said pair of brake shoes from the braking position substantially independently of said first and second resilient members.

2. The drum brake of claim 1 in which the moment created by said first resilient member is slightly larger than the moment created by said second resilient member.

* * * * *